United States Patent [19]

Dalton

[11] 4,036,467
[45] July 19, 1977

[54] VALVE
[75] Inventor: Thomas B. Dalton, Muskegon, Mich.
[73] Assignee: Westran Corporation, Muskegon, Mich.
[21] Appl. No.: 570,744
[22] Filed: Apr. 23, 1975
[51] Int. Cl.² ............... F16K 31/122; F16K 31/60; F16K 31/143
[52] U.S. Cl. .......................... 251/14; 251/319; 251/324
[58] Field of Search .............. 251/14, 321, 319, 324; 137/461

[56] References Cited

U.S. PATENT DOCUMENTS

| | | |
|---|---|---|
| 1,065,285 | 6/1913 | Walker, Jr. .................. 251/14 |
| 1,181,144 | 5/1916 | LaPorte ....................... 251/14 |
| 1,516,011 | 11/1924 | Heath ........................... 251/14 |
| 1,586,695 | 6/1926 | Petersen ..................... 137/461 |
| 2,496,286 | 2/1950 | Goldman ....................... 251/14 |
| 2,633,098 | 3/1953 | Ellis ............................. 251/14 |
| 2,809,799 | 10/1957 | Cunningham, Jr. .......... 251/14 |
| 3,049,331 | 8/1962 | Quesinberry ................. 251/14 |
| 3,384,110 | 5/1968 | Wiley ........................... 137/461 |

FOREIGN PATENT DOCUMENTS

| | | |
|---|---|---|
| E4,999 | 3/1956 | Germany ....................... 251/14 |
| 1,141,604 | 1/1969 | United Kingdom ........... 251/14 |

Primary Examiner—Martin P. Schwadron
Assistant Examiner—G. L. Walton
Attorney, Agent, or Firm—Gifford, Chandler, Sheridan & Sprinkle

[57] ABSTRACT

A valve which may be manually operated between an on and off position and in addition includes a high pressure shut-off mechanism which is responsive to an external pressure. The valve comprises a housing having a through bore, a transverse fluid inlet bore which intersects the through bore, and a transverse fluid outlet bore which intersects the through bore and is axially displaced from the fluid inlet bore. A control shuttle is disposed in the through bore and is manually movable between a first position and a second position in the through bore so that in the first position the control shuttle permits fluid communication between the inlet and the outlet bore whereas in the second position the control shuttle obstructs fluid communication between the inlet and outlet bore. In addition a hydraulic actuator having a piston is disposed in the through bore axially spaced from the control shuttle and is responsive to external and internal hydraulic pressure so that when the external hydraulic pressure exceeds a predetermined value, the piston engages the control shuttle and moves the control shuttle from its first position to its second position thus stopping the fluid communication from the inlet and the outlet bores.

2 Claims, 3 Drawing Figures

VALVE

BACKGROUND OF THE INVENTION

I. Field of the Invention

The present invention relates generally to valves and more particularly to a manually actuated valve having a hydraulic shut-off mechanism which is responsive to an external hydraulic pressure.

II. Description of the Prior Art

There are many previously known valves. One type of valve comprises a manually actuated valve member having an automatic, high pressure shut-off mechanism so that when the pressure in the lines exceeds a predetermined valve, fluid communication in the lines obstructed.

The disadvantage of the previously known valves with automatic high pressure shut-off mechanisms is that it is often desirable to activate the shut-off mechanism in response to an external pressure rather than the line pressure. Heretofore the previously known valves with automatic shut-off mechanisms responsive to an external pressure have been not only expensive to manufacture but also prone to failure during operation.

SUMMARY OF THE PRESENT INVENTION

The present invention overcomes the disadvantage of the previously known valves by providing a manually operable valve with an automatic shut off mechanism responsive to an external pressure which is not only inexpensive to manufacture but also virtually fail-safe in operation. Generally the valve of the present invention comprises a housing with an axial through bore and having transverse inlet and outlet bores intersecting the through bore and axially spaced from each other. A control shuttle is disposed in the through bore and is manually movable by a handle between a first and a second position. In the first position the control shuttle permits fluid communication between the inlet and outlet bores whereas in the second position the control shuttle obstructs the fluid communication between the inlet and outlet bores.

The automatic high pressure shut-off mechanism generally comprises a piston disposed in the through bore and resiliently urged away from the control shuttle. The hydraulic piston communicates with an external pressure so that when the external pressure exceeds a predetermined value, the piston moves towards the control shuttle, engages the control shuttle, and moves the control shuttle from its first position to its second position thereby obstructing the fluid communication between the inlet and outlet bores in the housing.

Although the valve of the present invention enjoys widespread application, the valve has been found to be of particular utility for use as a shut-off valve in trailers, arbor press devices, special testing devices, and on other lifting mechanisms wich require high power.

BRIEF DESCRIPTION OF THE DRAWINGS

The present invention will be more clearly understood by reference to the following detailed description when read in conjunction with the accompanying drawing, wherein like reference characters refer to like parts throughout the several views, and in which.

DETAILED DESCRIPTION

Figure 1:
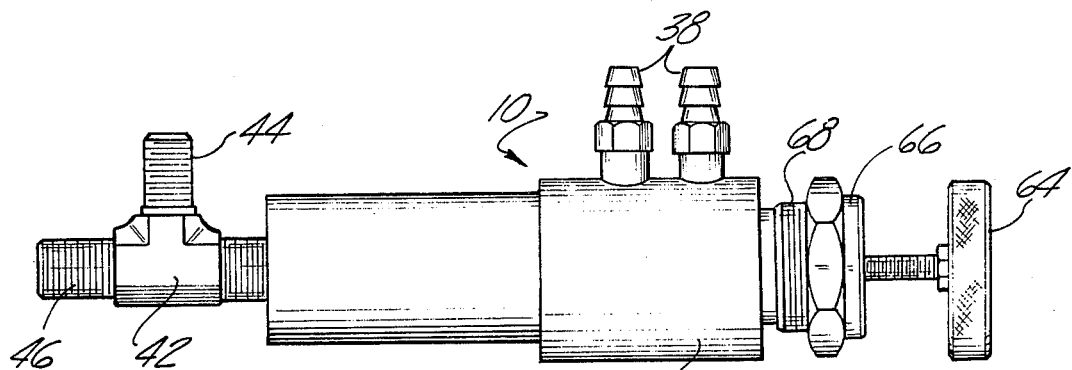
FIG. 1 is a side plan view showing the valve of the present invention.
Figure 3:
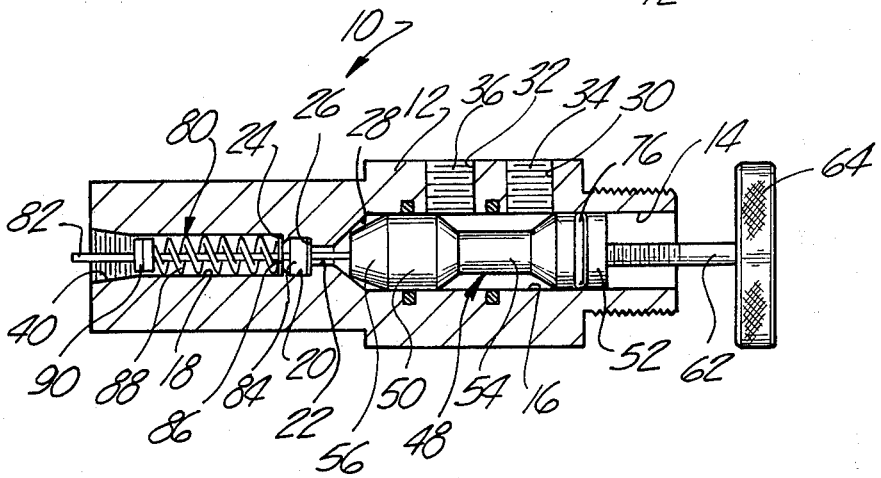
FIG. 3 is a cross sectional view of the valve of the present invention similar to FIG. 2 but with the control shuttle in its first position.

Referring primarily to FIGS. 1 and 3, the valve 10 of the present invention generally comprises a cylindrical housing 12 with a through bore 14 formed axially through the housing 12. The through bore 14 includes a large diameter portion 16 and reduced diameter portions 18, 20 and 22 so that annular abutment surfaces 24 and 26, and a conical abutment surface 28 are formed along the through bore 14. A transverse inlet bore 30 and a transverse outlet bore 32 are formed through the housing 12 so that both bores 30 and 32 intersect the enlarged diameter portion 16 of the through bore 14. The bores 30 and 32 are axially spaced from each other and preferably threaded at 34 and 36, respectively, to receive conventional pneumatic fittings 38. Similarly, the reduced diameter portion 18 of the through bore 14 is threaded at 40 to receive a conventional T-fitting 42 therein. As will later be more clearly understood, the T-fitting 42 communicates with a source of external hydraulic pressure through an inlet 44 and an outlet 46 of the T-fitting 42.

A control shuttle 48 is disposed in the enlarged diameter portion 16 of the through bore. The control shuttle 48 is generally cylindrical in shape and includes a front portion 50 and a rear portion 52 both of which have substantially the same diameter as the enlarged diameter portion 16 of the through bore 14. A reduced diameter portion 54 of the control shuttle 48 is formed intermmediate the front portion 50 and rear portion 52 of the control shuttle 48 for a purpose to be later hereinafter described. The front portion 50 of the control suttle 48 includes a conical cap 56 with a flat transverse surface 58.

The rear portion 52 of the control shuttle 48 includes an axial bore 60 which is adapted to receive a stem 62 of a handle 64. A retaining cap 66 (FIG. 1) threadably engages threads 68 formed on the periphery of the housing 14 and functions to retain the control shuttle 48 within the enlarged diameter portion 16 of a through bore 14. Lastly, annular grooves 70 and 72 with sealing means 74, preferably in the form of an o-ring, are provided in the housing 14 along the enlarged diameter portion 16 of the through bore 14 to create a sealing engagement between the front portion 50 of the control shuttle 48 and the housing 12. Similarly, sealing means 76 are provided in an annular groove 78 formed in the rear portion 52 of the control shuttle 48 to provide a sealing engagement between the rear portion 52 of the control shuttle 48 and the housing 12.

For ease of description the manual operation of the valve 10 of the present invention will now be described.

Referring to FIG. 3 the control shuttle 48 is there shown in its first position having its conical cap 66 abutting against the conical abutment surface 28. With the control shuttle 48 in its first position, there is fluid communication between the inlet bore 30 and the outlet bore 32 since the bore 30 and 32 register with the reduced diameter portion 54 of the control shuttle 48.

Figure 2:
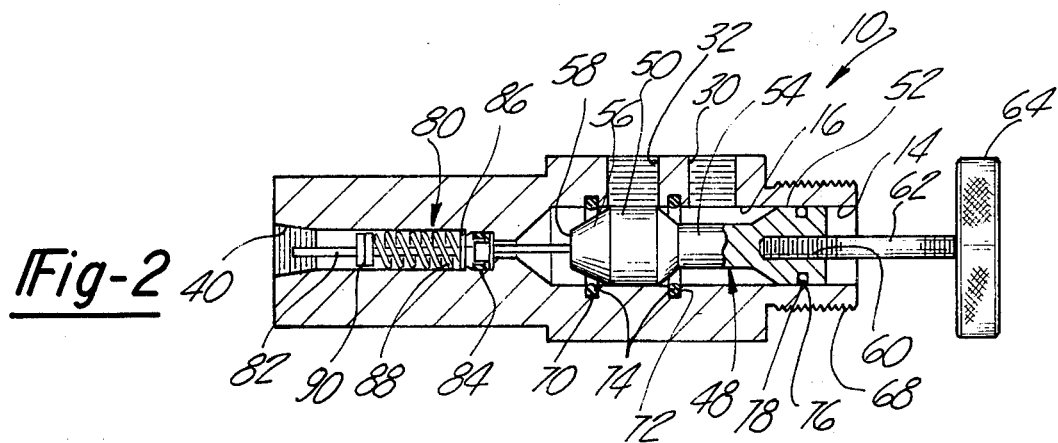
FIG. 2 is a cross sectional view of the valve of the present invention, showing the control shuttle in its second position, and with parts removed for clarity.

In order to shut off the fluid communication between the inlet bore 30 and the outlet bore 32, the handle 64 is manually forced rightward as viewed in FIG. 2 thus moving the control shuttle 48 to its second position. In its second position the front portion 50 of the control shuttle 48 registers with the outlet bore 32 thus shutting off the fluid communication between the bores 30 and 32. If the control shuttle 48 is shifted even more rightward than the position viewed in FIG. 2, the sealing means 74 and the annular grooves 72 will continue to provide a sealing engagement between the enlarged portion 50 of the control shuttle 48 and the housing 12 thereby continuing to obstruct the fluid communication between the bores 30 and 32.

It should be apparent from the foregoing that the axial length of the reduced diameter portion 54 of the control shuttle 48 must be dimensioned in accordance with the axial spacing between the bores 30 and 32 so as to permit fluid communication between the bores 30 and 32 when the control shuttle 48 is in its first position. It should also be apparent that the sealing means 76 provided around the rear protion 52 of the control shuttle 48 prevents the pneumatic pressure at the inlet port 30 from escaping through the through bore 14.

A hydraulic actuator 80 responsive to the external hydraulic pressure in the T-fitting 42 is also carried in the through bore 14. The hydraulic actuator 80 generally comprises a piston 82 which extends through a cup seal 84 which is positioned within the reduced diameter portion 20 of the through bore 14. The cup seal 84 is preferably constructed of urethane and serves to prevent the hydraulic fluid, typically oil, from entering the enlarged diameter portion 16 of the through bore 14. A washer-type spring seat 86 abuts against the abutment surface 24 and functions as a spring seat for a helical spring 88. A second spring seat 90 is secured to the piston 82 so that the spring 88 resiliently urges the piston 82 axially away from the control shuttle 48.

In operation as the hydraulic pressure in the fitting 42 increases, the piston 82 moves axially toward the control shuttle 48 thus compressing the spring 88. Thus, assuming that the control shuttle 48 is in its first position shown in FIG. 3, as the hydraulic pressure in the fitting 42 increases, the piston 82 extends through the cup seal 84 and the reduced diameter portion 22 of the through bore 14 until the piston 82 abuts against the flat surface 58 of the cap 66 of the control shuttle 48.

Referring now to FIG. 2, a further increase of hydraulic pressure in the fitting 42 causes the piston 82 to shift the control shuttle 48 from its first position to its second position (FIG. 2) thereby shutting off the fluid communciation between the inlet bore 30 and the outlet bore 32. A subsequent drop in hydraulic pressure permits the piston 82 to return to the position shown in FIG. 3 but the drop inhydraulic pressure does not affect the position of the control shuttle 48. The control shuttle 48 can then be only manually returned to its first position.

It can thus be seen that the valve of the present invention provides a manually operable pneumatic valve with an automatic shut-off means responsive to a predetermined external hydraulic pressure. It should also be apparent that by merely changing the spring rate of the helical spring 88 in the hydraulic actuator 80, the actuation pressure for the actuator 80 can be modified to meet the required design needs. For example, in practice it has been found that the hydraulic actuation pressure may be conveniently varied from between 500 to 3000 psi.

It should also be apparent that the valve of the present invention not only is inexpensive in construction but also virtually fail-safe due to the limited number of moving components within the valve.

Having thus described my invention, many modifications thereto will become apparent to those skilled in the art to which it pertains without deviating from the spirit of the invention as defined by the scope of the appended claims.

What is claimed is:

1. A valve comprising:
   a housing having a through bore,
   a fluid inlet bore intersecting said through bore,
   a fluid outlet bore intersecting said through bore at a position longitudinally spaced from said inlet bore,
   a control shuttle disposed in said through bore and axially movable between a first and second position, said control shuttle being operable to permit fluid communication between said inlet bore and said outlet bore when said control shuttle is in said first position, said control shuttle being operable to shut off the fluid communication between said inlet bore and said outlet bore when said control shuttle is in said second position;
   a handle secured to said control shuttle for moving said control shuttle to said first and second positions, and
   a hydraulic actuator responsive to an external hydraulic pressure and operable to shift said control shuttle from said first position to said second position when said external pressure exceeds a predetermined value whereby said control shuttle remains in said second position until returned by said handle to said first position, said hydraulic actuator comprising a piston disposed in said through bore and movable axially therein toward and away from said control shuttle, said piston being movable independently of said control shuttle, a second fluid inlet formed in said housing in communication with the side of said piston away from said control shuttle to move said piston toward said control shuttle upon a predetermined increase in the fluid pressure at said second fluid inlet, said piston having a portion engaging said control shuttle to move said control shuttle from said first position to said second position when said control shuttle is in said first position and said predetermined pressure has been produced at said second fluid inlet.

2. The invention as defined in claim 1 wherein said control shuttle further comprises a front portion and a rear portion, sealing means disposed between said through bore and said portions, and a reduced diameter portion intermediate said front portion and said rear portion, said reduced diameter portion being of such longitudinal length that said fluid inlet bore and said fluid outlet bore register with said reduced diameter portion of said control shuttle when said control shuttle is in said first position.

* * * * *